A. C. VAUGHAN.
DECOY.
APPLICATION FILED FEB. 3, 1915.
1,185,559. Patented May 30, 1916.
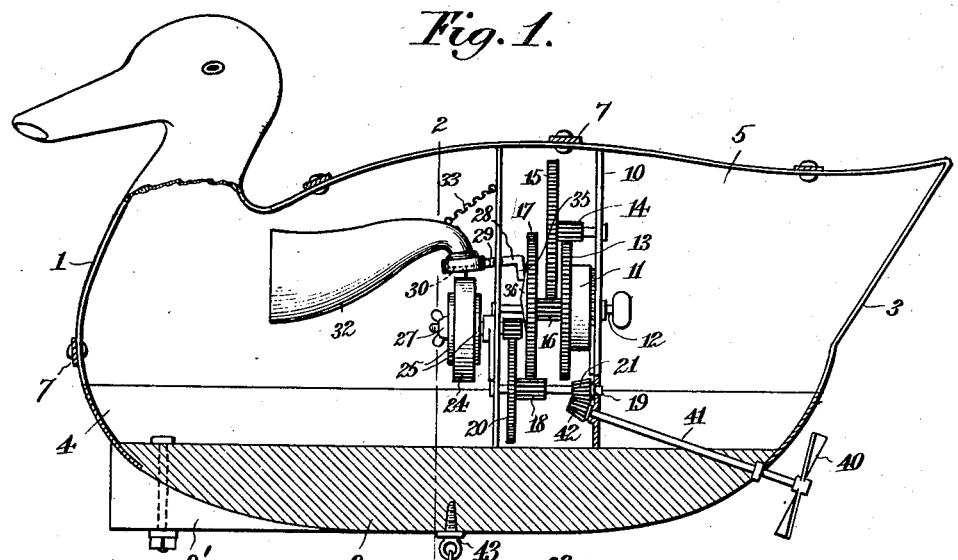
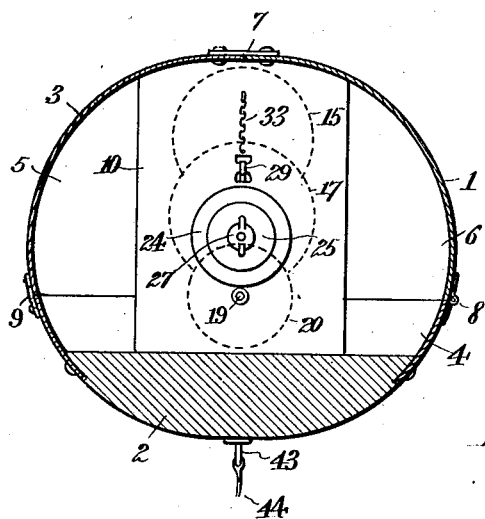
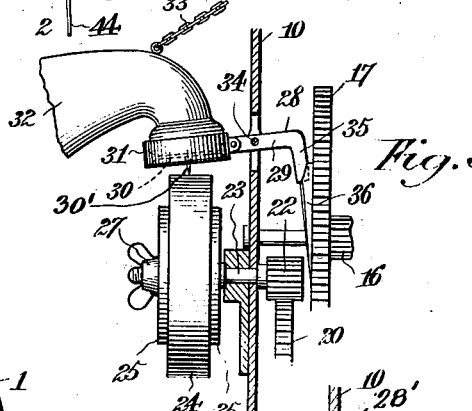
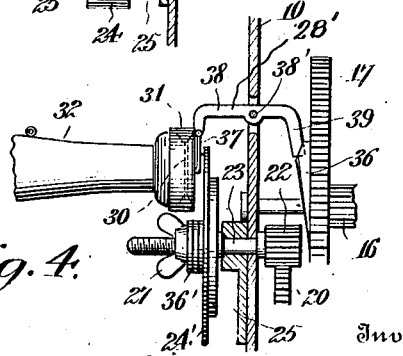
Inventor,
Amos C. Vaughan
By Victor J. Evans,
Attorney.
Witnesses:

UNITED STATES PATENT OFFICE.

AMOS C. VAUGHAN, OF ANADARKO, OKLAHOMA.

DECOY.

1,185,559. Specification of Letters Patent. Patented May 30, 1916.

Application filed February 3, 1915. Serial No. 5,925.

*To all whom it may concern:*

Be it known that I, AMOS C. VAUGHAN, a citizen of the United States, residing at Anadarko, in the county of Caddo and State of Oklahoma, have invented new and useful Improvements in Decoys, of which the following is a specification.

This invention relates to mechanical decoys, such as are made in the form of ducks, geese, and other water fowl, adapted to give cries or calls in imitation of the natural fowl to serve as a lure whereby natural fowl are attracted.

The object of the invention is to provide a decoy of simple construction, embodying therein phonographic means for automatically giving at predetermined intervals a call or cry, and which may also move about in the water to simulate the motions of natural fowl.

The invention consists of the features of construction, combination and arrangement of parts herein fully described and claimed, reference being had to the accompanying drawing in which:—

Figure 1 is a vertical longitudinal section of a decoy, in the form of a duck, embodying my invention. Fig. 2 is a vertical transverse section on the line 2—2 of Fig. 1. Fig. 3 is a detail view on an enlarged scale, partly in section, showing more clearly the sound producing mechanism. Fig. 4 is a similar view of the mechanism as adapted for use in connection with a disk record instead of a cylinder record.

Referring to the drawing, 1 designates the body of the decoy, which may be made in simulation of a duck, goose, or other fowl or bird. This body is preferably hollow and composed of a bottom portion 2, of wood or other suitable material, and top portion 3 of sheet metal, canvas or other suitable material. The portion 3 includes a lower section 4 secured to the bottom 2, and an upper section formed of divided portions 5 and 6 rigidly united by suitable connecting elements 7. The portion 3 is hinged or pivoted at one side to one of the sides of the portion 4, as shown at 8, and is adapted to be secured at its opposite or free side to the other side of the portion 4 by any suitable type of fastening means, generally indicated at 9, the construction being such as to provide a body having relatively hinged or pivoted bottom and top sections adapted to be opened and closed for convenience in assembling, cleaning and repairing the internal parts. The body is provided with an adjustable rudder 9', which may be set to guide the decoy or cause it to describe any desired circle upon the water.

Arranged within the body is a suitable frame structure 10 which supports a clockwork mechanism 11, including a winding shaft 12 and a primary drive gear 13 driven therefrom. The gear 13 drives a pinion 14 on a shaft with a gear 15 meshing with a pinion 16 on a shaft with a transmission gear 17. The transmission gear 17 in turn meshes with a pinion 18 on a driving shaft 19 carrying a spur gear 20 and a beveled gear 21. The gear 20 is arranged to rotate in a plane parallel with the gear 17 and meshes with a pinion 22 on a horizontal shaft 23, which is suitably journaled upon the frame structure 10 and is adapted to support the sound record of the phonographic mechanism. As shown in Figs. 1 and 2 a record cylinder 24 may be employed and secured between flanges or disks 25 and 25, the former being fixed to the shaft and the latter removable to permit of the application and removal of the record, the said removable flange or disk being secured in position by means of a clamping screw 27 fitted on a threaded extension of the outer end of the shaft.

Carried by the framework is a bell-crank shaped lever 28, which has an arm 29 connected with the sound box or casing of a reproducer 31, carrying a sound horn 32, the weight of the reproducer and horn being supported from the frame work 10 by a chain or other suitable supporting medium 33. The said arm 29 of the lever 28 is pivoted to the frame work 10, as at 34, so as to maintain the lever in a normally balanced position through the force of gravity. The stylus or needle 30' carried by the diaphragm 30 engages and is influenced by the sound groove of the record 24, which is of a proper character to vibrate the lever and diaphragm to give the proper call or cry. The other arm 35 of the lever 28 is arranged within the path of a controlling cam 36 on the outer face of the gear 19, which engages the arm 35 at intervals to tilt the lever thereby throwing the stylus or needle to an inoperative position, so that the calls or cries will be sounded with proper intervals of silence between them.

It will be evident from the foregoing description, that when the clock work mechanism is set into action the needle of the reproducing mechanism, which is normally in position for operation, will be vibrated by the rotating record and will actuate the sound diaphragm to give the call or cry, and that after one or more calls or cries are given the cam will render the needle inoperative for a predetermined period, so that the calls sounding, with the intervals of silence between calls, will closely simulate the calls or cries of the natural bird. It will of course be understood that the cam instead of throwing the stylus out of action may on the other hand throw the stylus into action in which event the lever will operate to hold the needle or stylus out of action.

Instead of employing a cylinder record, I may employ a disk record, as illustrated in Fig. 4, the record 24' being mounted upon the shaft 23 in place of the record 24 and secured in place by the aforementioned fastening means, one or more suitable washers 36' being employed to take up the space between the record and the flange 25. For use in conjunction with such a record, a lever 28' is employed which lever has a vertical stylus carrying arm 37 connected with the diaphragm, a horizontal arm 38 pivotally mounted upon the frame work as at 38', and a vertical arm 39, the latter being arranged to coöperate with the cam 36 for the purpose before described. It will be understood that this lever is pivotally balanced so as to be normally disposed and held by gravity in position for coöperation with the record, and that the lever is tilted and thrown at intervals from an active to an inactive position, during which period there is a cessation of actuation of the calling mechanism. It will, of course, be understood that in this case also the lever may be mounted so as to normally remain inactive and be periodically thrown into action by the cam, which variation falls within the spirit and scope of the invention.

It will be evident from the foregoing description that upon swinging the upper section of the body to an open position the clock work mechanism and working parts of the sounding or calling mechanism may be exposed, allowing the clock work mechanism to be conveniently wound and all the parts to be lubricated, cleaned, repaired or replaced whenever required.

A propeller 40 may be mounted at the rear of the body on a shaft 41 carrying a pinion 42 meshing with the gear 21 by which the decoy may be propelled in a given path.

In practice the bottom 3 is provided with an eye bolt or other connection 43 to which may be attached a suitable weight or anchor 44, whereby the decoy will be prevented from drifting away while allowed to float upon the surface of the body of water.

When the decoy is in use, the propeller is set into action, and the rudder may be adjusted so that the decoy will move in a circumscribed circular path and will simulate the action of the natural fowl moving about upon the surface of the water. While so moving the call mechanism will be sounded at fixed intervals through the action of the clock work mechanism, as will be readily understood.

I claim:

1. A decoy including a hollow body having a sound escape outlet, a frame within the body, said frame including a plate having an opening therein, a lever pivotally mounted within an opening in the plate and having angularly disposed arms extending on opposite sides of said plate, a clock-work mechanism supported by the frame and including a transmission gear, a record holding shaft journaled upon and extending through said plate and driven at one end from said gear, a cam carried by the transmission gear for vibrating said lever and adapted for coöperation with one of the arms of the lever, and a sound producing device supported by the other arm of the lever and adapted for coöperation with a record supported by the record holding shaft.

2. A decoy including a hollow body having a sound escape opening, a frame within the body, a clock-work mechanism supported by the frame and including a transmission gear having a cam projection, a vibrating lever having oppositely projecting arms, one of said arms being adapted to be engaged by the cam, whereby the lever is vibrated upon its pivotal connection, a sound producing mechanism supported by the other arm of the lever, a shaft in gear with the transmission gear and adapted to support a sound record, and means for securing the sound record thereon.

In testimony whereof I affix my signature in presence of two witnesses.

AMOS C. VAUGHAN.

Witnesses:
R. M. Pell,
John Brush.